(12) United States Patent
Tenhunen et al.

(10) Patent No.: US 6,870,619 B1
(45) Date of Patent: Mar. 22, 2005

(54) SPECTROMETER AND METHOD FOR MEASURING OPTICAL SPECTRUM

(75) Inventors: Jussi Tenhunen, Oulunsalo (FI); Jouko Malinen, Kempele (FI); Markku Känsäkoski, Oulu (FI)

(73) Assignee: Valtion Teknillinen Tutkimuskeskus, VTT (FI)

( * ) Notice: Subject to any disclaimer, the term of this patent is extended or adjusted under 35 U.S.C. 154(b) by 202 days.

(21) Appl. No.: 10/089,161

(22) PCT Filed: Sep. 27, 2000

(86) PCT No.: PCT/FI00/00824

§ 371 (c)(1),
(2), (4) Date: Jul. 26, 2002

(87) PCT Pub. No.: WO01/23848

PCT Pub. Date: Apr. 5, 2001

(30) Foreign Application Priority Data

Sep. 29, 1999 (FI) .............................. 19992092

(51) Int. Cl.[7] .................................. G01J 3/28
(52) U.S. Cl. ..................... 356/330; 356/310; 356/328
(58) Field of Search ............................... 356/310, 330, 356/328

(56) References Cited

U.S. PATENT DOCUMENTS

| | | |
|---|---|---|
| 3,859,515 A | 1/1975 | Radcliffe |
| 3,915,571 A * | 10/1975 | Winter ...................... 356/333 |
| 4,448,529 A | 5/1984 | Krause |
| 4,615,619 A | 10/1986 | Fateley |
| 4,790,652 A | 12/1988 | Unéus et al. |
| 4,790,654 A | 12/1988 | Clarke |
| 4,856,897 A * | 8/1989 | Fateley et al. ............... 356/333 |
| 5,114,231 A * | 5/1992 | Gautherin et al. ........... 356/328 |
| 5,504,575 A | 4/1996 | Stafford |
| 5,608,519 A * | 3/1997 | Gourley et al. ............... 356/318 |
| 5,631,735 A | 5/1997 | Nagai |
| 5,748,308 A * | 5/1998 | Lindberg et al. ............ 356/328 |
| 5,856,871 A | 1/1999 | Cabib et al. |

FOREIGN PATENT DOCUMENTS

| | | |
|---|---|---|
| EP | 0 548 830 A1 | 6/1993 |
| EP | 0 550 076 A1 | 7/1993 |
| WO | 85/04261 | 9/1985 |

OTHER PUBLICATIONS

James D. Batchelor et al., "Development of a Digital Micromirror Spectrometer for Analytical Atomic Spectrometry," *Analytical Chemistry*, V. 70, 1998, pp. 4907–4914.

P. Krippner et al., "Microspectrometer for the Infrared Range," *SPIE*, V. 2783, 1996, pp. 277–282.

P. Rai–Choudhury, ed., *Handbook of Microlithography, Micromachining, and Microfabrication*, vol. 2: Micromachining and Microfabrication, 1997, IEE, pp. 236–376.

Martin Harwit et al., *Hadamard Transform Optics*, Academic Press, 1979, pp. v–ix.

J. A. Decker, Jr., "Experimental Realization of the Multiplex Advantage with a Hadamard–Transform Spectrometer," *Applied Optics*, V. 10, 1971, pp. 510–514.

* cited by examiner

*Primary Examiner*—F. L. Evans
*Assistant Examiner*—Kara Geisel
(74) *Attorney, Agent, or Firm*—Young & Thompson (57) ABSTRACT

An entrance slit of the spectrometer is illuminated with optical radiation. An optical component images the entrance slit to an optical modulator by the optical radiation and disperses the optical radiation into a spectrum. The spectrum is modulated by the optical modulator The optical component composes spectral non-dispersive measurement radiation of the spectrum and images the entrance slit included in the measurement radiation to an exit slit which may be the same one as the exit slit or a different one. Measurement radiation is detected from the entrance slit with a detector, which converts the measurement radiation into an electrical measurement signal.

31 Claims, 6 Drawing Sheets

SPECTROMETER AND METHOD FOR MEASURING OPTICAL SPECTRUM

FIELD OF THE INVENTION

The invention relates to spectrum measurement. In particular, the invention relates to a method of measuring an optical spectrum and to a spectrometer.

BACKGROUND OF THE INVENTION

Spectrometers are used for analysing the wavelength distribution of the intensity of optical radiation. In scanning grating monochromators and prism monochromators the radiation to be measured is supplied into the device through an entrance slit and the radiation is dispersed by a grating and a prism by supplying one wavelength band at a time to a single element detector and registering the intensity spectrum of the radiation to be measured directly as a function of the movement of the grating or mirror. The device measures only one wavelength band at a time and thus wastes most of the optical power available. Furthermore, this device requires a very accurate mechanical movement and its measurement, which are expensive. The device also wears in use and is sensitive to thermal expansion, dirt and vibration. Inaccuracy of movement of the grating and the drift of wavelength scale caused by it is a considerable error factor when the device is used for long-term quantitative or qualitative analysis of the chemical composition of samples in the NIR area (Near InfraRed).

In Fourier Transform Infra Red (FTIR) devices the radiation to be measured is led through a Michelson interferometer, the optical arms of which determine the difference in optical path length which is altered by a moving mirror during the measurement. The intensity of radiation that has passed the interferometer is measured as a function of the difference in optical path length by means of a single element detector, and the intensity distribution thus obtained as the function of the difference in optical path length is called an interferogram. The intensity spectrum of radiation is calculated from the interferogram using a Fourier transform. The FTIR device measures all wavelengths simultaneously. Thanks to multiplexing, the FTIR device provides a considerably better signal-to-noise ratio than the scanning grating monochromator if the detector noise is the dominant source of noise, which is usually the case in the IR area. Since this technique requires an interferometer which includes a moving mirror, it is extremely sensitive to interference in the environment, such as vibration and temperature changes. Furthermore, modulation resulting from sample movement causes interference as a moving sample is measured.

The scanning grating monochromator can be implemented without the problems caused by the mechanical movement by forming the grating by an acoustic wave in an AOTF component (Acousto Optical Tunable Filter). Scanning is performed by changing the grating constant, and thus its angular dispersion is changed by altering the frequency of the acoustic wave. This solution is, however, expensive, generates only a small amount of optical power and does not provide the advantage of multiplexing.

In a grating spectrograph the entrance slit is imaged onto the surface of a multi-element (e.g. 16 to 1024) row detector via the grating so that the place of the entrance slit image moves in the row detector in the longitudinal direction of a row (from one element to another) as a function of the wavelength, in which case each of the detector elements registers a separate wavelength band. No moving parts are needed in such a spectrograph and it provides the advantage of multiplexing. However, the row detector needed in the IR area in this solution is expensive, and furthermore, signal detection requires expensive and complex detection electronics. Change of the wavelength area or resolution requirement often entails a new expensive row detector, which may constitute a vicious circle. Concentration measurement devices based on absorption spectroscopy apply a method called 'ratio measurement', which is used for eliminating changes of the radiation source temperature, measurement geometry, scattering and detector response by calculating an estimate for the concentration of the substance to be measured from the ratio of the intensities measured at the absorption wavelength of the substance to be measured and at a reference wavelength selected from its side, in which case coefficient errors independent of the wavelength are eliminated in the division. Since the wavelength responses of different elements in the row detector vary due to the deficiencies in the manufacturing process, their temperatures change at slightly different rates, which causes errors dependent on the wavelength and time. For this reason thermal stabilization of the row detector is considerably more difficult than that of a single element detector and leads to expensive and heavy solutions in device implementations.

New kind of cheaper spectrometers have been implemented by modulating different wavelength channels selectively with a deformable micromirror device DMD provided in the place of the row detector of the grating spectrograph or with another component suitable for spatial modulation. Modulated optical signals are imaged to the detector and the intensities of the wavelength channels to be measured are detected by demodulating a signal measured by the detector. Since the grating that separates the wavelengths from one another spreads the image of the entrance slit on the modulator surface, the image to be produced therefrom is still too large, and thus the device requires a detector with a large surface area, which is expensive, often difficult to obtain and also has too high a capacitance, which results in slow function of the detector. The fact that the detector is also dependent on the temperature also causes problems in this solution and thermal stabilization is needed. Such a solution is described more closely in Batchelor, J. D., Jones, B. T.: Development of a Digital Micromirror Spectrometer for Analytical Atomic Spectrometry, Analytical Chemistry, Vol. 70, No. 23, pp. 4907 to 4914, Dec. 1, 1998, which is incorporated herein by reference.

Very cheap miniature spectrographs have been produced in large series using various mass production techniques (LIGA, etc.), but the problem related to these devices is that diffused light, which scatters from poor-quality optical surfaces and contains all wavelengths, spreads on the row detector surface and forms a level below which optical powers cannot be detected reliably. This restricts the measurable variation range of the concentration of an absorbing substance. The LIGA technique is explained in greater detail e.g. in P. Kripper, J. Mohr, C. Müller, C. van der Sel, Microspectrometer for the Infrared Range, SPIE vol. 2783, pages 277 to 282, 1996, which is incorporated herein by reference. The LIGA technique is also described in Handbook of Microlitography, Micromachining and Microfabrication, P. Rai-Choudhury, ed., vol. 2 Micromachining, and Microfabrication, pages 237 to 377, 1997.

BRIEF DESCRIPTION OF THE INVENTION

An object of the invention is to provide a method and a spectrometer implementing the method to solve the abovementioned problems. This is achieved with a method of measuring the spectrum of optical radiation by a spectrometer described in the introduction. The method comprises illuminating an entrance slit of a spectrometer with optical radiation and imaging the entrance slit to an optical modulator, which comprises modulating elements; dispersing the entrance slit image into a spectrum with a dispersing component so that each wavelength of the spectrum forms a separate image from the entrance slit, the place of the image on the elements of the optical modulator depending on the wavelength; modulating the dispersed entrance slit image with at least one element of the optical modulator, in which case at least one wavelength band modulated from the entrance slit image is formed; directing at least one modulated wavelength band to the dispersing component, which is used for composing non-dispersive measurement radiation from at least one modulated wavelength band so that when the image is formed at all different wavelengths, the entrance slit images are formed in the same place regardless of the wavelength; imaging the entrance slit to the exit slit by means of the non-dispersive measurement radiation; detecting the measurement radiation from the exit slit with one detector, which converts the measurement radiation into an electrical measurement signal; demodulating the electrical measurement signal to separate signal components formed by different wavelength bands from one another, and measuring at least one wavelength band with at least one signal component.

The invention also relates to a spectrometer for measuring optical spectra. The spectrometer comprises: an entrance slit, at least one dispersive component, at least one imaging component, an optical modulator, an exit slit and one detector, and the entrance slit in the spectrometer is arranged to limit the amount of the optical radiation entering the spectometer and the imaging component is arranged to image the entrance slit to the modulator, which comprises modulating elements; the dispersive component being arranged to disperse the entrance slit image into a spectrum so that each wavelength of the spectrum forms a separate image of the entrance slit, the place of the image on the elements of the optical modulator depending on the wavelength; the optical modulator is arranged to modulate the dispersed entrance slit image with at least one element of the optical modulator to form at least one wavelength band modulated from the entrance slit image; the dispersive component is arranged to compose non-dispersive measurement radiation from at least one modulated wavelength band so that when the image is formed at all different wavelengths, the entrance slit images are formed in the same place regardless of the wavelength; the imaging component is arranged to image the entrance slit to the exit slit by means of measurement radiation; one detector is arranged to detect measurement radiation from the exit slit and convert the measurement radiation into an electrical measurement signal; the spectrometer is arranged to demodulate the electrical measurement signal to separate signal components formed by different wavelength bands from one another; and the spectrometer is arranged to measure at least one wavelength band with at least one signal component.

The preferred embodiments of the invention are disclosed in the dependent claims.

The invention is based on the use of one small detector for series-form detection of a spectrum. A small detector can be used because the dispersed spectrum is composed with a dispersive component so that the entrance slit is imaged to the same place with different wavelength components and the composed measurement signal can be focused on a small detector. Furthermore, instead of imaging a sample, the entrance slit is imaged to the modulator, and from the modulator the entrance slit is imaged to the exit slit.

The method and system of the invention provide several advantages. Since the solution utilizes the dispersive component twice, the measurement signal can be composed of a dispersed spectrum and imaged to the exit-slit as a very small image of the entrance slit, which enables the use of one detector with a small surface area. The capacitance of the small detector is low and the speed high, which enables high series-form analysis speed. With one detector the wavelength response is also temporally constant at different wavelengths. Since no macroscopically moving parts are needed, the function of the spectrometer is stable and environment resistant, and the spectrometer can be implemented using inexpensive wear-resistant components. The solution according to the invention can be integrated into a miniature spectroscope in which the influence of diffused light is reduced efficiently by means of the spectrometer structure.

BRIEF DESCRIPTION OF THE DRAWINGS

The invention will be described in greater detail by means of preferred embodiments with reference to the accompanying drawings, in which.

DETAILED DESCRIPTION OF THE INVENTION

The measurement method and spectrometer according to the invention are particularly suitable for transmission and reflection measurements which are used for determining e.g. the concentration, thickness or temperature of substances, but the invention is not limited to these applications. The solution of the invention can be used for implementing an electrically controllable filter, which comprises sharp-edged pass bands and stop bands that can be selected in the desired manner, and which is utilized e.g. in research equipment. The solution of the invention can also be applied e.g. in automatic process analysers and sensors in which low price, small size and immunity to environment, for example, are important aspects.

Figure 1A:
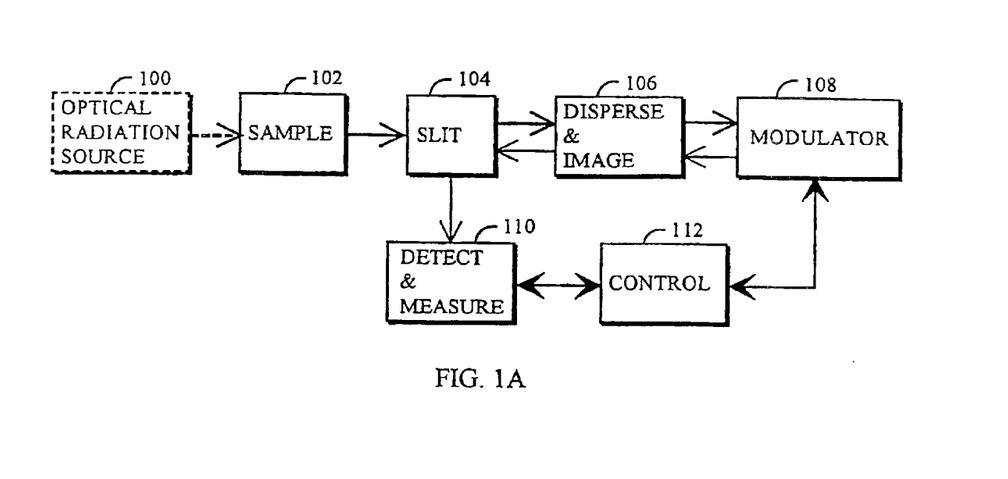
FIG. 1A is a block diagram of a spectrometer.

First the solution of the invention will be described with reference to FIG. 1A. Whether the spectrometer needs an optical power source 100 depends on the application. If the sample 102 is self-radiant, for example, the optical power source 100 is not necessary. The optical power source can be a wide-band power source, such as the sun, day light, incandescent lamp, halogen lamp, gas discharge lamp, etc. In some applications it is also possible to use a narrower optical band which is obtained by filtering wide-band radiation or by using e.g. different lasers or leds as the optical power source. In this application optical radiation refers to radiation in a wavelength area which starts from ultraviolet radiation (about 40 nm) and continues to the far infra red area (about 1 mm) in the vacuum.

In this solution the sample 102 is in the front of an entrance slit 104. Radiation is emitted, reflected or scattered from the sample 102 to the entrance slit 104 of the spectrometer, which limits the amount of radiation to spectrometric measurement. The slit 104 is typically rectangular and has a size of e.g. 20 µm to 1000 λm×1 mm to 15 mm, even though the shape and size of the slit 104 are not particularly relevant to the invention. In the solution according to the invention the slit 104 is imaged to an optical modulator 108 with an imaging element included in an optical component 106. In addition to imaging, the radiation from the opening 104 is dispersed into a spectrum with a dispersive component, which is also included in the optical component 106. The dispersive component may be e.g. a prism or a grating. In dispersion it holds approximately true for the grating that the difference of the angle of departure and the angle of incidence multiplied by the grating constant is the multiple of wavelength, i.e. $a(\sin \theta_m - \sin \theta_i) = m\lambda$, where a is the grating constant, $\theta_m$ is the angle of departure, and $\theta_1$ is the angle of incidence. The prism dispersion is based on the fact that the relative index n of refraction of the prism is a function of the wavelength $\lambda$. It can be seen from the law of prism refraction $\sin \alpha - n(\lambda) \sin \beta = 0$ that the ratio of the sine function sine of the angle of incidence to the sine function $\sin \beta$ of the angle of departure is the same as the relative index n of refraction, which is dependent on the wavelength. Thus the dispersive component directs optical radiation to different angles at different wavelengths. A lens, a lens combination, a mirror, a mirror combination or a combination of a lens/lenses and a mirror/mirrors can function as the imaging element in the manner known per se.

Figure 7A:
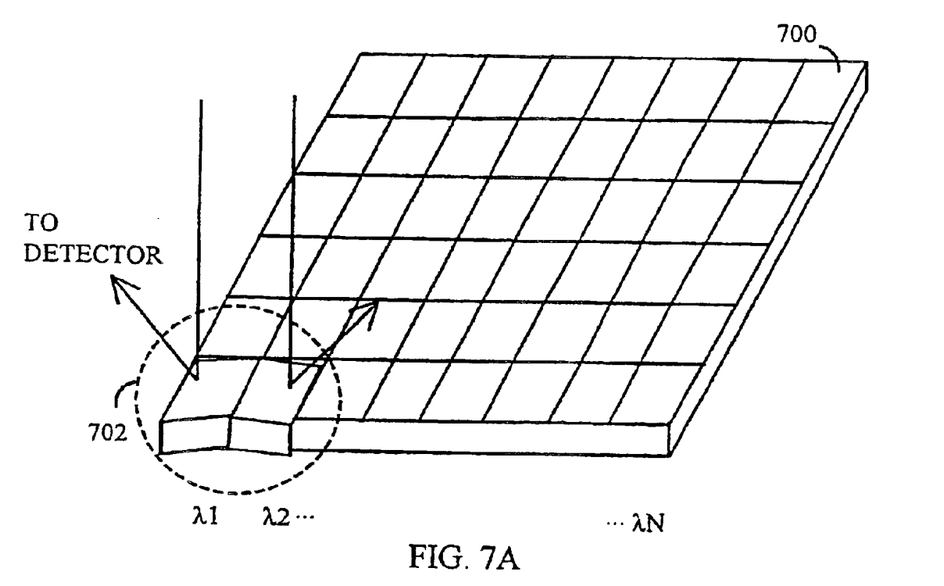
FIG. 7A illustrates an optical modulator which reflects optical radiation, and FIG. 7B illustrated an optical modulator which transmits optical radiation.
Figure 7B:
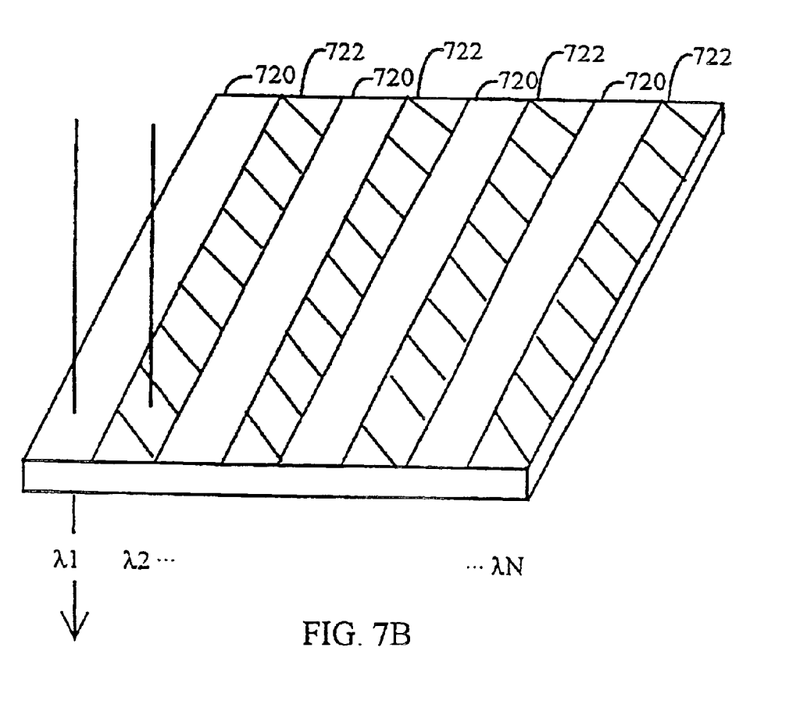

The modulator 108 is preferably an electrically controllable spatial modulator of optical radiation, which is illustrated in greater detail in FIG. 7. The modulator 108 comprises e.g. small transparent or reflective elements, the transmission and reflection of which can be changed separately. A certain narrow section of the spectrum, i.e: a wavelength band, is directed to each transparent or reflective element from the dispersive component of the optical component 106. The modulator 108 can be used for modulating wavelength bands: by attenuating the other wavelength bands at a certain moment the modulator 108 can select at least one wavelength band which has been generated by the dispersive component of the optical component 106 and which propagates further to the dispersive component of the optical component 106. As the optical radiation dispersed into spectral components by the dispersive component hits the same or a similar dispersive component again, dispersivity of the radiation disappears, i.e. the angle distribution of direction caused by dispersion of spectral components disappears. In this way the dispersive component first disperses optical radiation in the solution according to the invention, and the same or a different dispersive component composes measurement radiation from one or more wavelength bands. In an image formed with the measurement radiation the images of the entrance slit at different wavelengths are substantially in the same place. In block 106 the optical measurement radiation from the modulator 108 is also imaged to the exit slit 104, which may be the same one as the entrance slit or a different one. From the entrance slit 104 the radiation propagates to the detector and further to measurement devices in a detection and measuring block 110. The function of the modulator 108 and the detection and measuring block 110 is controlled by a control unit 112.

Figure 1B:
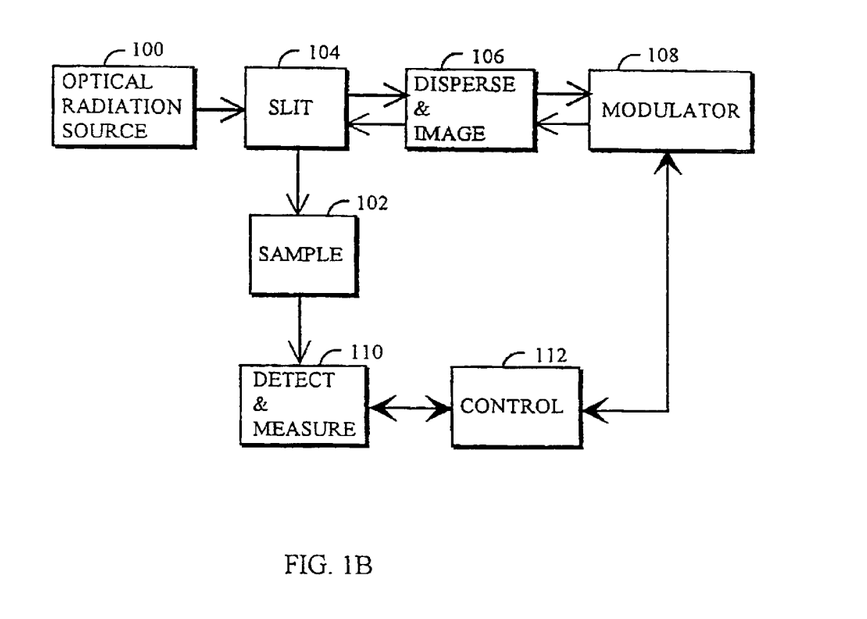
FIG. 1B is a block diagram of a spectrometer.

FIG. 1B is a similar block diagram of an inventive spectrometer, but in this solution the sample 102 and the entrance slit 104 are in different locations. In this example the sample 102 is in the front of the entrance slit 104. A self-radiant sample cannot be used in this solution. Otherwise the measuring function and the spectrometer components are substantially similar.

Figure 2A:
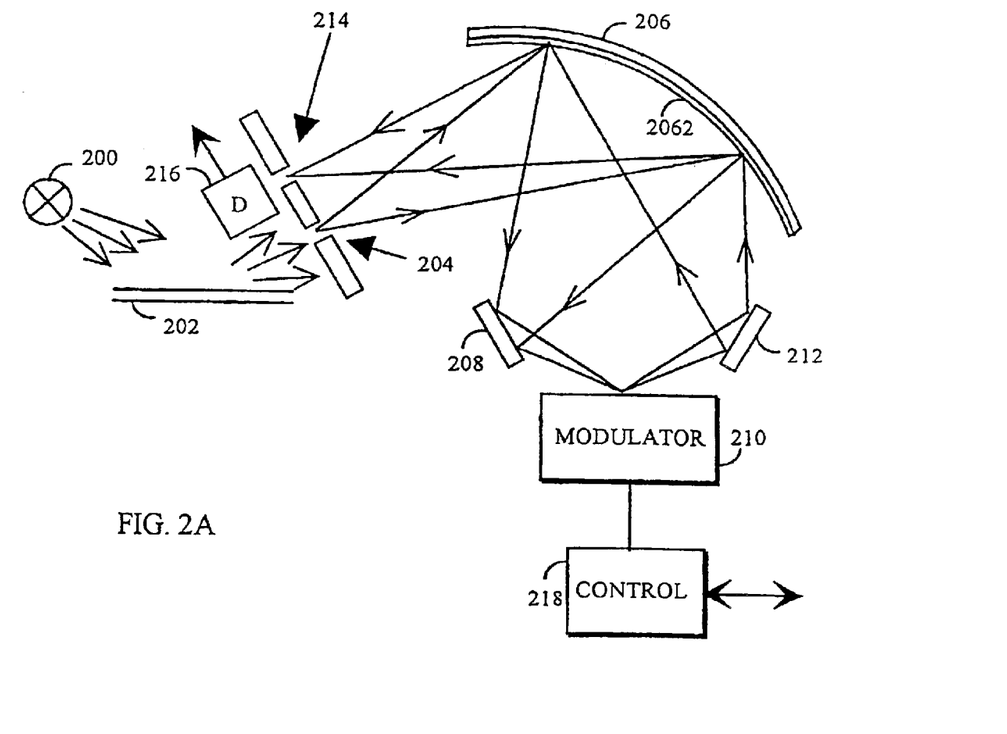
FIG. 2A illustrates a configuration of a spectrometer.

FIG. 2A illustrates a solution according to the invention in which the sample is not self-radiant. The optical radiation from an optical power source 200 is directed to the surface of the sample 202. From the sample the optical radiation is reflected and scattered to an entrance slit 204 from which the optical radiation is directed to a concave mirror 206, which comprises a grating 2062. The grating 2062 is patterned e.g. holographically, with photolithography or by directly machining the surface of the mirror 206 mechanically in a manner known per se. The mirror 206 images the entrance slit 204 via a plane mirror 208 to an optical modulator 210. The optical modulator 210 selects or performs time-divisional frequency-divisional or code-divisional modulation on wavelength bands, which the optical modulator 210 reflects back to the concave mirror 206 via a plane mirror 212. The optical modulator 210 is e.g. a DMD component which comprises small mirror elements. The mirrors 208 and 212 are needed as deflection optics because they enable the use of the same optics (dispersive component 2062 and imaging component 206) on the both sides of the optical modulator 210 so that the image of the entrance slit 204 is formed in an exit slit 214 next to the entrance slit 204. The mirrors 208 and 212 are needed to separate the entrance slit 204 and the exit slit 214 physically from each other by means of the angle of reflection. The grating in the concave mirror 206 composes the wavelength bands into measurement radiation, and the concave mirror 206 reflects and focuses measurement radiation to the exit slit 214, where the detector 216 receives the measurement radiation and converts the optical measurement radiation into an electrical measurement signal. It is common to all embodiments of the invention that the grating rows must be parallel with the entrance and exit slits to allow the spectrometer to function correctly because the spectrum is spread perpendicularly to the direction of the grating lines. In FIG. 2A this means that in the optical modulator the wavelength distribution is parallel with the normal of the paper surface. Even though the detecting surface area of the detector is small, usually a few square millimeters at most, it is essential to the inventive solution that substantially the whole entrance slit is imaged to the detector. This way the inventive solution does not lose optical power past the detector. The number N of wavelength bands to be separated is usually 4 to 1000 in the inventive solution. The width of one wavelength band typically ranges from one nanometer to a few dozens of nanometers in the inventive solution, although this does not limit the invention. In that case the wavelength resolution $\Delta \lambda$ to be achieved is good. The half cone angle of the detector optics is about 35°, which is at least as good as in the best prior art spectrometers. The irradiance, i.e. power density, obtained for the detector is comparable to the product $L * \Delta \lambda * \Omega$, where L=the spectral radiance of radiation to be measured, $\Delta \lambda$=the width (nm) of wavelength band (channel), $\Omega$=the solid angle which the arriving radiation fulfils seen from the detector. L and $\Delta \lambda$ are determined by the typical limitations of the embodiment, whereas the devices used determine the maximum value for Ω. Since Ω is comparable to the half cone angle of the arriving radiation, the power density obtained for the detector strongly depends on the optics solution used.

The electrical measurement signal is transferred further to an automatic signal processing and analysis device (not shown in FIG. 2A), where the measurement signal is filtered and information on the wavelength bands is processed with an automatic data processing device. The thickness of coating, for example, can be measured from the sample 202 by means of spectrum analysis. Thus it is possible to measure the thickness of kaolin or the like on paper surface, for instance. The function of the modulator 210 is controlled by a control unit 218, the functions of which are connected to another measurement device.

Figure 2B:
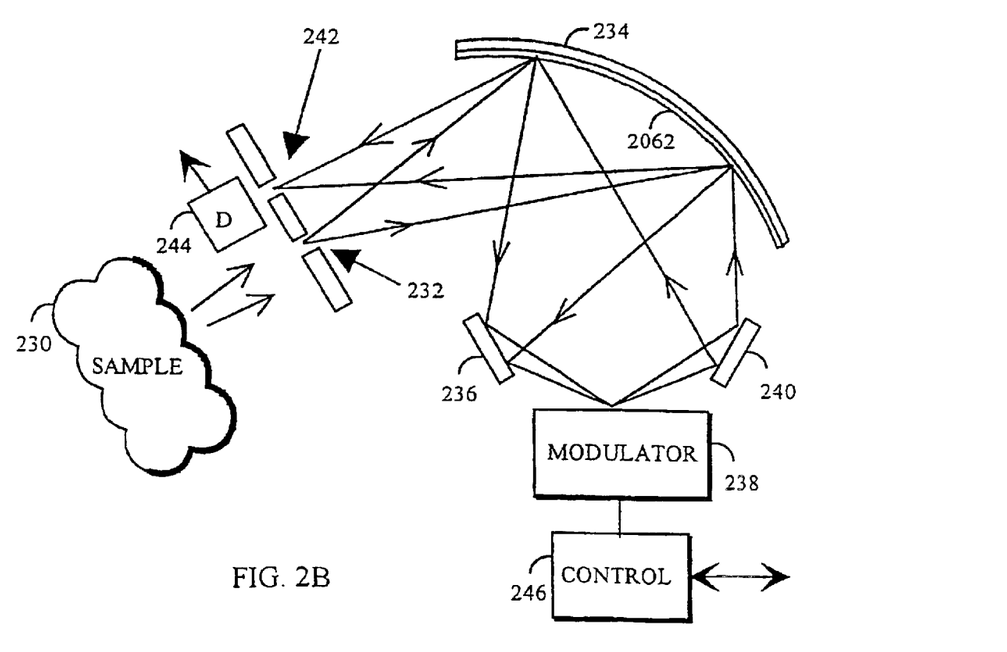
FIG. 2B illustrates a configuration of a spectrometer.

FIG. 2B shows the principles of a measuring arrangement in which the sample 230 is self-radiant. The optical radiation emitted by the sample 230 propagates to a combination of a mirror 234 and a grating 2062 via an entrance slit 232. The optical radiation dispersed into its wavelength bands forms the image of the entrance slit to a modulator 238 via a mirror 236, and the modulator modulates the optical radiation and reflects the modulated wavelength bands to the combination of the mirror 234 and the grating 2062 via a mirror 240. The optical measurement signal composed by the grating 2062 and focused by the mirror 234 is imaged to an exit slit 242 where a detector 244 detects the optical measurement signal and converts it into electrical form for data processing. Even though the inventive solution always comprises an exit slit 242, a separate exit slit component is not necessary, but the detector 244, for example, can function as the exit slit 242 so that the detecting surface or the like defines the exit slit. In this spectrometer arrangement measurement is also controlled by a control unit 246.

Figure 3:
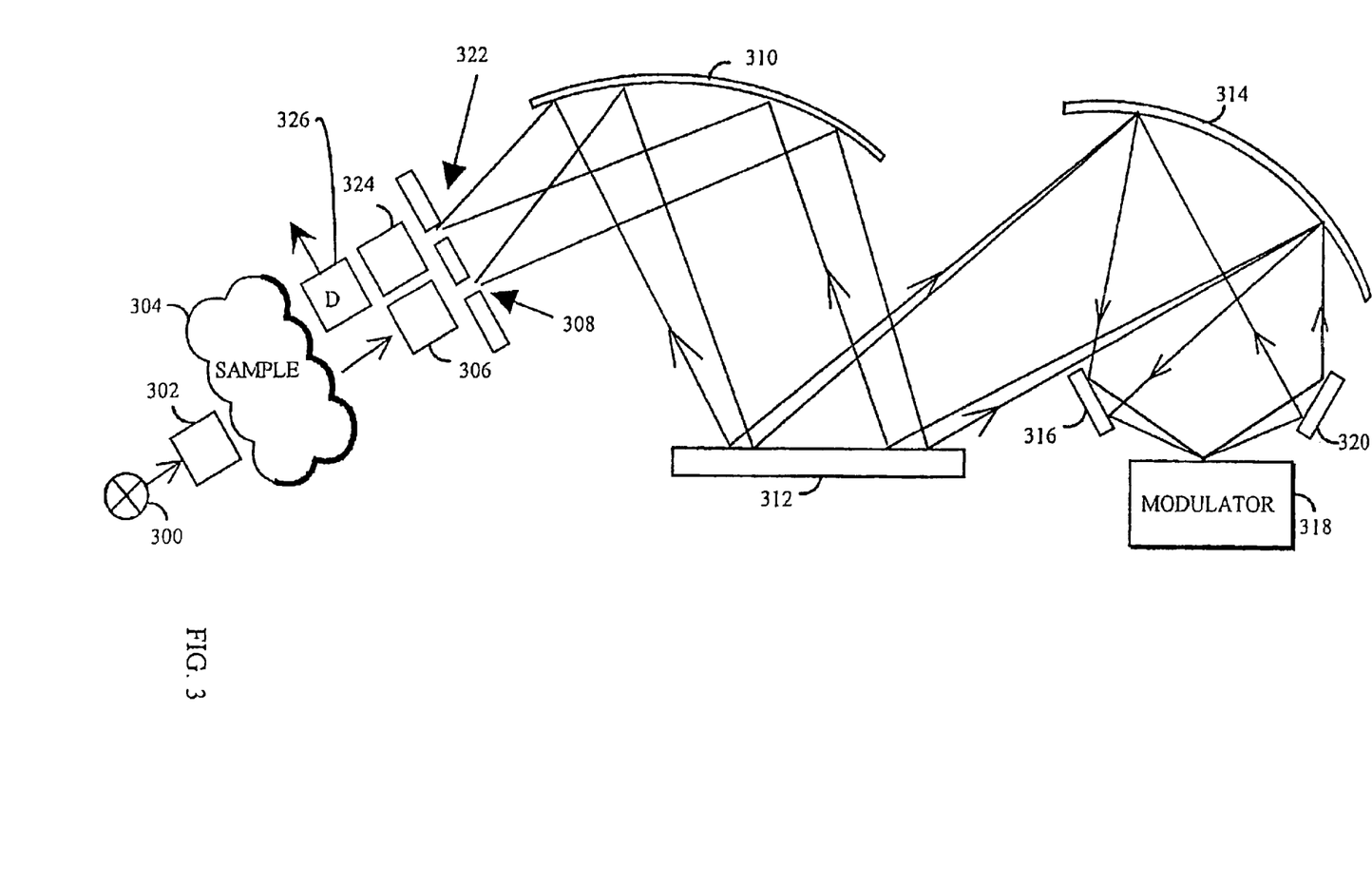
FIG. 3 illustrates a configuration of a spectrometer.

FIG. 3 illustrates the arrangement according to the invention in greater detail, using a sample which can be transilluminated as an example. Radiation from an optical power source 300 is collected with an optical element 302, which may be e.g. a lens, a lens combination, a mirror or a mirror combination, and the collected optical radiation is directed to the sample 304. The radiation that has reflected and/or scattered from the sample and/or passed through it is collected to an entrance slit 308 with an optical element 306, which may also be a lens, a lens combination, a mirror or a mirror combination. In the inventive solution the optical element 306 is preferably implemented with Köhler optics. In this solution the optical radiation from the entrance slit 308 is collimated by means of a concave mirror 310 and reflected to a grating 312. The grating 312 reflects the optical radiation dispersed into a spectrum to another concave mirror 314, which images the entrance slit to an optical modulator 318 via a plane mirror 316. From the optical modulator 318 the modulated optical radiation is reflected back to the concave mirror 314 via another plane mirror 320, and the concave mirror collimates the dispersing optical radiation to the grating 312. The grating 312 composes measurement radiation from the wavelength bands and reflects the measurement radiation to the concave mirror 310, which finally images the entrance slit 308 to an exit slit 322. An optical element 324 images the entrance slit 322 to a detector 326, which detects the optical measurement signal.

Figure 4A:
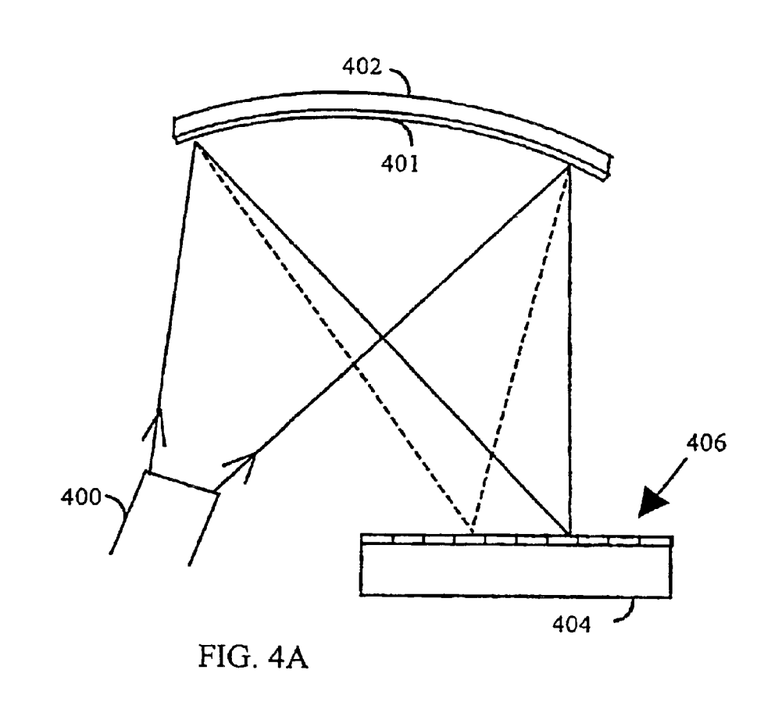
FIG. 4A illustrates use of optical fibres in a spectrometer.
Figure 4B:
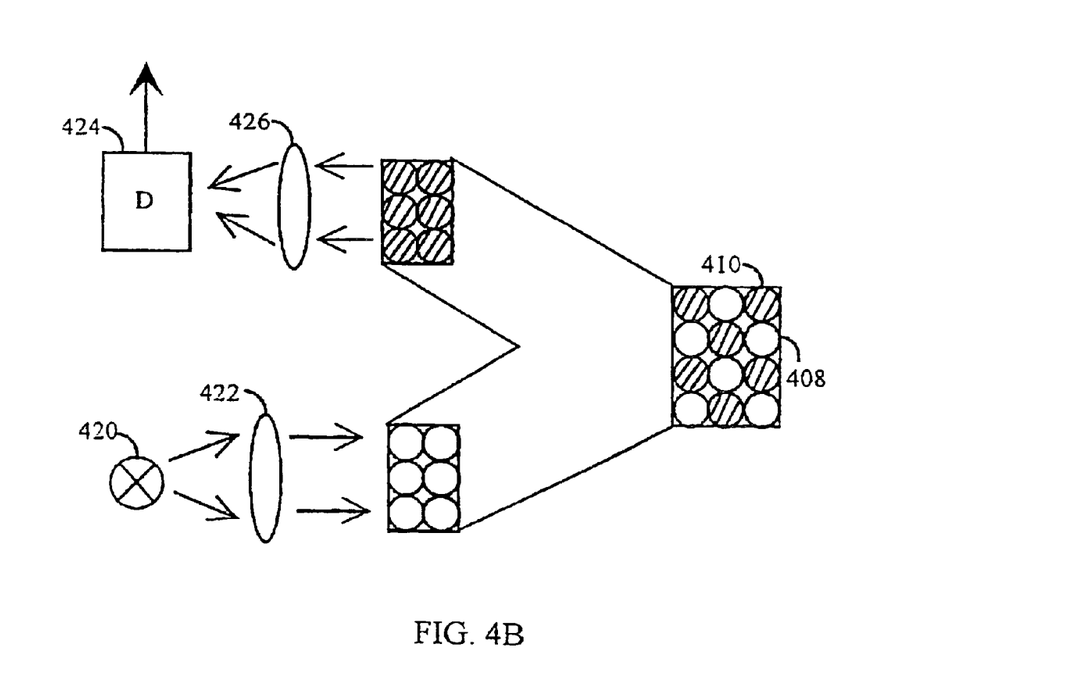
FIG. 4B illustrates the end of a fibre bundle.

FIGS. 4A and 4B illustrate a solution in which the entrance slit and exit slit are the end of a fibre bundle. This solution considerably simplifies the optics between the entrance and exit slits and the optical modulator, enabling use of a large numerical aperture. It is also easy to apply this solution to the areas of visible light and near infrared. Optical radiation is directed from a fibre bundle 400 to a concave mirror 402, which comprises a grating 401. The mirror 402 images the end of the fibre bundle to an optical modulator 404. Each element 406 of the optical modulator 404 detects an image of the fibre bundle end formed by a different wavelength band (two different wavelength bands are marked in the figure with a continuous line and a dotted line). The elements 406 of the optical modulator 404 reflect the modulated image back to the concave mirror 402, whose grating 401 composes measurement radiation from the optical radiation reflected from the modulator. The measurement radiation is reflected back to the fibre bundle end, in which case the fibre bundle image (entrance slit) is imaged to the end of the fibre bundle (exit slit).

FIG. 4B illustrates the end of the fibre bundle 400. The fibre bundle 400 comprises fibres 408 that emit optical radiation and fibres 410 that receive optical radiation. Optical power is supplied to the emitting fibres 408 from an optical power source 420 e.g. by an optical element 422, which is a lens or a mirror. From the receiving fibres 410 the optical power is directed to the detector 424 by an optical element 426, which is a lens or a mirror. The emitting fibres 408 and the receiving fibres 410 are mixed with one another.

Figure 5A:
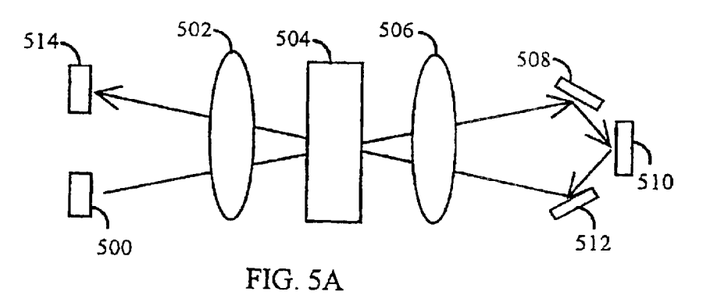
FIG. 5A illustrates location of an imaging lens and a grating in a spectrometer.

FIG. 5A shows an inventive solution in which lenses are used. Optical radiation from an entrance slit 500 hits a lens 502, which collimates the optical radiation. A grating 504 disperses the optical radiation and a lens 506 images the entrance slit to an optical modulator 510 via a mirror 508. The modulated optical radiation is reflected via the mirror 512 back to the lens 506, which collimates the optical radiation. The grating 504 composes measurement radiation from the optical radiation, and the lens 502 images the optical radiation to an exit slit 514 to which an image of the entrance slit 500 is formed. From this stage onwards processing of the measurement radiation is similar to that illustrated in the other figures.

Figure 5B:
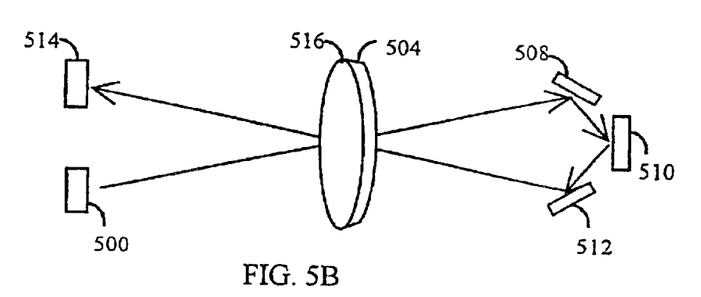
FIG. 5B illustrates how an imaging lens and a grating are combined in a spectrometer.

FIG. 5B is similar to FIG. 5A, except that in this solution the two lenses 502, 506 and the grating 504 are combined. In that case the grating 504, which is produced holographically or with photolithography, is on the surface of a lens 516. In the solution of the invention it is important that the grating disperses parallel optical radiation, which is possible when the optical radiation is collimated or when the grating is on the refracting surface of the lens that images the entrance slit to the modulator or on the reflecting surface of the mirror that images the entrance slit to the modulator, which is the case in all figures in this application.

Figure 6:
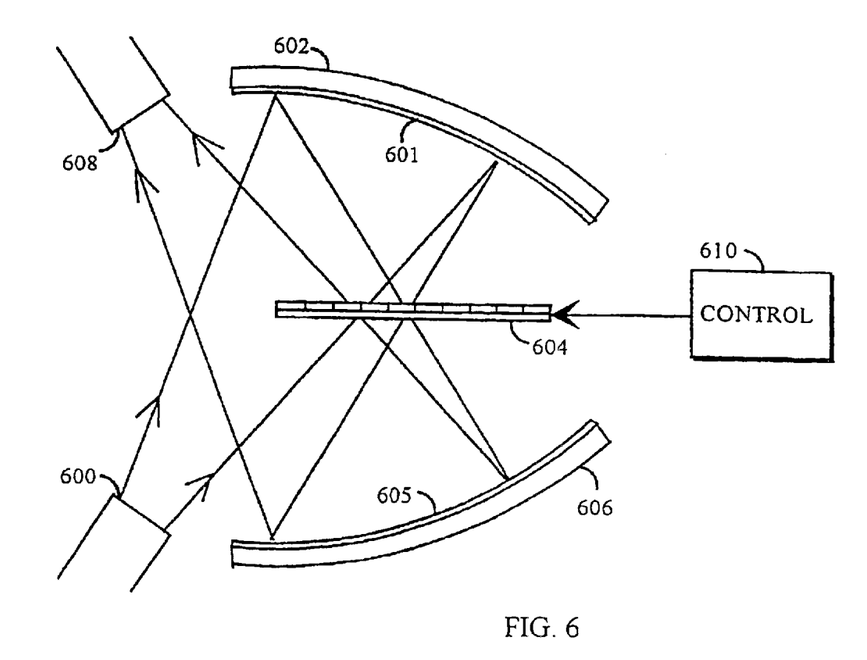
FIG. 6 illustrates use of a transparent optical modulator in a spectrometer.

FIG. 6 illustrates a solution according to the invention in which the function of the optical modulator is based on changing the transmission of the optical radiation of the modulating elements in the modulator. In this solution optical radiation is directed from an entrance slit 600, which is the end of a fibre bundle in this example, to a mirror 602, which also comprises a dispersive component 601. The optical radiation of the entrance slit, which is dispersed into a spectrum, is imaged to an optical modulator 604 with a concave mirror 602. The modulated optical radiation passes though the optical modulator 604 and the optical radiation disperses to another dispersive component 605, which is similar to the first dispersive component 602. The dispersive component 605 is in the same element as the concave mirror 606 and composes measurement radiation from at least one wavelength band received by it, the measurement radiation being used by the mirror 606 for imaging the image of the entrance slit 600 from the modulator 604 to the exit slit 608, which is also the end of a fibre bundle in this example.

FIGS. 7A and 7B schematically illustrate a reflecting and a transparent optical modulator. The reflecting optical modulator may be a DMD, for example. Use of a DMD modulator together with a dispersive component, which both disperses and composes optical radiation, provides a very low diffused radiation level at the detector, thus enabling detection of very small optical powers. The DMD modulator shown in FIG. 7A comprises a number of matrix-form micromirror elements 700 which can be moved separately. The size of a micromirror is e.g. 16 $\mu$m×16 $\mu$m and there may be hundreds of mirror both in the vertical and the horizontal direction. When the direction of the mirrors is changed, the optical radiation that has hit the mirrors is reflected in different directions as is illustrated in 702. Thus a desired portion of the optical radiation that has entered the modulator can be reflected to the detector. Each modulator element has two extreme states to which the element can be connected: a state in which the element attenuates the optical radiation towards the detector minimally, and a state in which the element attenuates the optical radiation towards the detector maximally. Usually the element can also be connected to any other state between these extreme states. Thus each element can modulate the optical radiation towards the detector with a function which is either discontinuous or continuous with respect to the time. In the example of FIG. 7A wavelength $\lambda 1$ is directed so that it propagates to the detector. The other wavelengths $\lambda 2$ to $\lambda N$ are directed so that they do not propagate to the detector. The DMD component is described in greater detail in U.S. Pat. No. 5,504,575, which is incorporated herein by reference.

An LC (Liquid Crystal) component, for example, can function as a transparent optical modulator, as is shown in FIG. 7B. The function of the LC component is based on polarization of optical radiation. By changing the crystalline structure of the liquid crystal by an electric field the direction of the optical radiation polarization can be rotated, which is obvious to a person skilled in the art and needs not be discussed further in this context. In the LC modulator element states can be controlled so that attenuation of each modulator element changes as a function which is discontinuous or continuous with respect to time or has discrete values. In FIG. 7B elements 720 transmit optical radiation well, whereas elements 722 attenuate optical radiation considerably. In that case odd wavelengths $\lambda 1$, $\lambda 3$ . . . are admitted to the detector, whereas even wavelengths $\lambda 2$, $\lambda 4$, . . . are not admitted to the detector. Magneto-optic, acousto-optic and mechanical modulators can also be used as intensity modulators, in particular. The mechanic modulator may be e.g. a rotating disc, which comprises a transparent zone for each wavelength band at different distances from the centre of the disc.

A liquid crystal modulator can also be used for changing the phase of the wavelength band of each element, in which case it is unnecessary to utilize polarization. The phase of the electric field of the wavelength band changes as the crystalline structure of the liquid crystal is changed with the electric field, and thus the index of refraction of the liquid crystal changes. Change of the index of refraction directly affects the speed of the optical radiation in the liquid crystal, which causes change of the optical radiation phase after the radiation has travelled the same distance at a different speed. Different wavelength bands are separated from one another on the basis of the phase during detection.

The phase can also be modulated with a moving mirror which is used as an element of the optical modulator. In that case each element is moved a different distance so that the distance travelled by each wavelength band to the detector changes a portion of the wavelength. The phase is detected by means of interference in a manner obvious to a person skilled in the art.

Optical radiation of a wavelength band can be modulated with an element of an optical modulator by changing a property of the optical radiation as a function of time, in which case the wavelength bands modulated by different elements can be separated from one another by demodulating in a corresponding manner. The property to be changed may be intensity or phase of the optical radiation entering the detector. At its simplest the modulation is such that one wavelength band is supplied to one detector used in the solution according to the invention at each moment. However, such a solution functions rather slowly.

Another alternative is waveform modulation. In that case different optical modulator elements are controlled so that the intensities of different wavelength bands differ at the detector according to different continuous or discontinuous functions. One solution is to modulate different elements at different frequencies. This is called frequency-divisional multiplexing. Each wavelength band is modulated at a different frequency, which is performed by making each modulator element vibrate from one state to another at a different modulation frequency. The modulation frequency makes the wavelength band focus on the common detector of the wavelength bands at the modulation frequency. After detection the electrical signals of the wavelength bands are separated from one another by demodulation. Demodulation can be performed e.g. by separating different modulation frequencies from one another by filtering, or demodulation is carried out by inverse Fourier transform (IFFT, Inverse Fast Fourier Transform).

Instead of control functions with different frequencies, it is possible to control different elements with different periodic functions. In that case the wavelength bands of different elements can be separated from one another during a period on the basis of the waveform of the function. One example of this is binary code multiplexing, which is a discontinuous function. Each wavelength band is encoded in a modulator with a code of its own, which is performed by connecting each modulator element from one extreme state to another according to a binary code, for example. After detection each wavelength band can be analysed separately by one detector by decoding the encoding. An example of such modulation is Hadamard multiplexing, which is known per se. Several slits are usually used in spectrometry utilizing the Hadamard transform, but in the solution according to the invention only one exit slit is needed. Hadamard multiplexing is described in greater detail e.g. in U.S. Pat. Nos. 4,615,619 and 3,859,515 and in Hadamard Transform Optics, Martin Harwit, Neil J. A. Sloane, Academic Press, 1979, which is incorporated her ein by reference.

Multiplexing of wavelength bands requires a lot from detector dynamics. The situation can be made easier in various ways. In frequency and code multiplexing different wavelength bands can often be phased so that as the power of one signal decreases, the power of another measurement signal increases. Wavelength bands belonging to a spectrum part which is not needed in the spectrum analysis can be omitted from modulation, which prevents their access to the detector. The requirement of dynamics can also be reduced by reserving one or more free modulation frequency bands next to wavelength bands significant to measurement. Different modulations and demodulations are controlled by a control unit 112.

The inventive solution can be applied to measurement of substance concentrations, for example. Not only liquids and gases but also solids can be measured. Transmission T of optical radiation at each wavelength λ depends on the concentration $C_j$ of one or more substances, absorption coefficient $\alpha_j$ and absorption distance I according to the following formula $$\ln[T(\lambda)] = \left(\sum_{j=1}^{N} C_j \alpha_j\right) l,$$

where j is a substance-specific index. Since each wavelength band modulated by the modulator in the solution according to the invention is narrow, the wavelength a corresponds to the wavelength band. The fact that a band is narrow usually means a band with a width of a few dozens of nanometers at most in the UV-V IS-IR area (UltraViolet-Visible-Infra Red). A band is also narrow when the band of one wavelength band constitutes only a portion (e.g. less than 2%) of the whole wavelength band area to be measured. By measuring the transmission T for a distance I known in advance and by using tabulated information on the absorption coefficients $\alpha_j$ of the substances, substance-specific concentration $C_j$ can be solved using the formula. The measurement device can also function as follows: the device is first calibrated with measurements of a sample series with known concentrations in a manner known per se to a person skilled in the art. In that case it is not necessary to know the absorption coefficients $\alpha_j$ and the distance l. Typical concentration measurements include protein content of grain, moisture content of the measurement object (particularly moisture content of paper) and gas content (e.g. methane content).

The solution according to the invention can also be used for measuring the thickness of a substance layer. A typical application is e.g. measurement of the thickness of the kaolin layer on paper. Since kaolin has a narrow-band intensity peak and cellulose of the paper wide-band flat intensity distribution, the kaolin thickness can be measured by comparing the height of the kaolin intensity peak with the flat cellulose intensity distribution as a function of time. When the ratio changes, the thickness of the kaolin layer also changes. Magnitude of the change in the ratio expresses the change in the kaolin layer thickness. Thickness of various substance layers, such as that of a plastic film, can be measured in a corresponding manner.

Both in the measurement of concentration and thickness of a substance the error at the 0 point of the intensity scale of wavelength bands depends on the device type and determines a range in which the attenuation measured by the spectrograph is linear to the real attenuation. Spectrographs are naturally used to obtain as high measurement capacity of the concentration variation range as possible, this range being directly proportional to the range in which the absorption measured by the spectrograph is linear. The diffused light produced by the grating or other optical components is particular significant in the case of miniature techniques because optics produced by cheap mass production techniques provide a high diffused light level, which reduces the dynamics range in the measurement of the intensity of wavelength bands. In the inventive solution the structure of the spectrometer (use of a similar dispersive component twice) decreases the disadvantageous effects of diffused light considerably.

The inventive solution can also be utilized in temperature measurement in that case we follow the behaviour of radiation of a black body according to the Wien's displacement law: The black body radiates at the highest intensity at wavelength $\lambda_{max}$, whose product with temperature T is constant, i.e. $\lambda_{max} T = 2.8978 \times 10^{-3}$ mK. By measuring the power of wavelength bands with a detector as a function of the wavelength and by finding the highest power we obtain the wavelength $\lambda_{max}$ of the highest intensity, from which the temperature can be calculated with formula $$T = \frac{2.8978 \times 10^{-3} \text{ mK}}{\lambda_{max}}$$

in a manner known per se to a person skilled in the art. Different spectrum analyses and measurements are performed by a detection and measurement unit 110.

The optical components used may be based on conventional refracting optics (convex and concave lenses and mirrors) or on diffraction optics (Fresnel lenses and binary optical components). In the production of a spectrometer optical components made of glass constitute the largest part of the price. The production costs and size of a spectrometer can be reduced by implementing the spectrometer with a plane waveguide, LIGA technique and moulded plastic optics. The LIGA technique is based on x-ray lithography, electroforming and moulding. The optical components of the spectrograph produced by the LIGA technique can be used in the near infrared area, in particular. Thus we obtain a miniature spectrometer which can be produced for one integrated circuit and integrated easily into almost any research or measurement device. In the solution according to the invention the influence of diffused radiation can be reduced considerably thanks to the use of an optical modulator and the structure of the spectrometer in which one kind of dispersive component is used both for dispersing optical radiation into a spectrum and for rendering wavelength bands of the optical radiation with different wavelengths parallel.

Electrical circuits can be implemented by hardware on a circuit board which comprises separate electronic components, or preferably e.g. by VLSI components (Very Large Scale Integrated Circuit) or by ASIC circuit technology (Application Specific Integrated Circuit). In the solution according to the invention automatic data processing can be carried out in a PC computer or by software run in a processor.

Even though the invention has been described with reference to an example according to the accompanying drawings, it is clear that the invention is not limited thereto but can be modified in various ways within the inventive concept disclosed in the appended claims.

What is claimed is:

1. A method of measuring optical radiation with a spectrometer, the method comprising illuminating an entrance slit (104, 204, 232, 308, 500, 600) of the spectrometer with optical radiation;

imaging the entrance slit (104, 204, 232, 308, 500, 600) to an optical modulator (108, 210, 238, 318, 406, 510, 604);

dispersing the entrance slit (104, 204, 232, 308, 500, 600) image into a spectrum with a dispersive component (106, 2062, 312, 401, 504, 601);

modulating the spectrum with the optical modulator, the spectrum being composed into a measurement signal with the dispersive element (106, 2062, 312, 401, 504, 605), and measuring the measurement signal by the spectrometer, characterized by imaging the entrance slit (104, 204, 232, 308, 500, 600) to an optical modulator (108, 210, 238, 318, 406, 510, 604), which comprises modulating elements;

dispersing the entrance slit (104, 204, 232, 308, 500, 600) image into a spectrum with the dispersive component (106, 2062, 312, 401, 504, 601) so that each wavelength of the spectrum forms an image of its own from the entrance slit (104, 204, 234, 308, 500, 600), the place of the image on the elements of the optical modulator (108, 210, 238, 318, 406, 510, 604) depending on the wavelength;

reflecting by a first mirror (208, 236, 316, 508, 601) the optical radiation from the dispersive component (106, 2062, 312, 401, 504, 601) to the optical modulator (108, 210, 238, 318, 406, 510, 604);

modulating the dispersed entrance slit (104, 204, 232, 308, 500, 600) image with at least one element of the optical modulator (108, 210, 238, 318, 406, 510, 604), in which case at least one wavelength band modulated from the entrance slit (104, 108, 232, 308, 500, 600) image is formed;

reflecting by a second mirror (212, 240, 320, 512, 605) the optical radiation from the optical modulator (108, 210, 238, 318, 406, 510, 604) to an exit slit (104, 214, 242, 322, 514);

directing at least one modulated wavelength band to the dispersive component (106, 2062, 312, 401, 504, 605), which composes non-dispersive measurement radiation from at least one modulated wavelength band so that the entrance slit (104, 204, 232, 308, 500, 600) image at each wavelength band is formed in the same place regardless of the wavelength;

imaging by means of the non-dispersive measurement radiation the entrance slit (104, 204, 232, 308, 500, 600) to an exit slit (104, 214, 242, 322, 514), which is different from the entrance slit (104, 204, 232, 308, 500, 600); and detecting, for spectrum measurement, the measurement radiation obtained from the exit slit (104, 214, 242, 322, 514) with one detector (110, 216, 244, 326, 424), which converts the measurement radiation into an electrical measurement signal; and demodulating the electrical measurement signal to separate signal components formed by different wavelength bands from one another and measuring at least one wavelength band with at least one signal component.

2. A method according to claim 1, characterized in that the optical modulator (108, 210, 238, 318, 406, 510, 604) is an optical DMD modulator.

3. A method according to claim 1, characterized by illuminating the entrance slit (104, 204, 232, 308, 500, 600) with optical radiation emitted by a sample (102, 202, 230, 304).

4. A method according to claim 3, characterized by illuminating the sample (102, 202, 230, 304) with measurement radiation and imaging the entrance slit (104, 204, 232, 308, 500, 600) to the exit slit (104, 214, 242, 322, 514) by means of the measurement radiation emitted by the sample (102, 202, 230, 304).

5. A method according to claim 1, characterized by modulating optical properties of the elements of the optical modulator (108, 210, 238, 318, 406, 510, 604) as a function of time by modulating different wavelength bands with different waveforms and separating different wavelength bands from one another during measurement by demodulation corresponding to the modulation.

6. A method according to claim 1, characterized by modulating optical properties of the elements of the optical modulator (108, 210, 238, 318, 406, 510, 604) as a function of time by multiplexing different wavelength bands using time division and separating different wavelength bands from one another during measurement by demodulation corresponding to the modulation.

7. A method according to claim 1, characterized by modulating optical properties of the elements of the optical modulator (108, 210, 238, 318, 406, 510, 604) as a function of time by multiplexing different wavelength bands using frequency division and separating different wavelength bands from one another during measurement by demodulation corresponding to the modulation or by filtering the frequencies apart from one another.

8. A method according to claim 1, characterized by modulating optical properties of the elements of the optical modulator (108, 210, 238, 318, 406, 510, 604) as a function of time by multiplexing different wavelength bands using code division and separating different wavelength bands from one another during measurement by demodulation corresponding to the modulation.

9. A method according to claim 1, characterized in that only one dispersive component (106, 2062, 312, 401, 504, 601) is used in the measurement.

10. A method according to claim 3, characterized by determining the concentration of at least one substance in the sample (102, 202, 230, 304) by means of at least one measured wavelength band.

11. A method according to claim 3, characterized by determining the thickness of a substance layer in the sample (102, 202, 230, 304) by means of at least one measured wavelength band.

12. A method according to claim temperature by means of at least one measured wavelength band.

13. A method according to claim 1, characterized in that the detector (110, 216, 244, 326, 424) forms the exit slit (104, 214, 242, 322, 514).

14. A method according to claim 1, characterized in that the spectrometer is produced for an integrated circuit.

15. A method according to claim 1, characterized in that the spectrometer has been produced using a plane waveguide, LIGA technique and moulded plastic optics.

16. A spectrometer for measuring an optical spectrum, the spectrometer comprising an entrance slit (104, 204, 232, 308, 500, 600), at least one dispersive component (106, 2062, 312, 401, 504, 601, 605), at least one imaging component (106, 206, 234, 314, 402, 506, 516, 602, 606), an optical modulator (108, 210, 238, 318, 406, 510, 604) and an exit slit (104, 214, 242, 322, 514); and the entrance slit (104, 204, 232, 308, 500, 600) in the spectrometer is arranged to limit the amount of optical radiation entering the spectrometer;

the imaging component (106, 206, 234, 314, 402, 506, 516, 602) is arranged to image the entrance slit (104, 204, 232, 308, 500, 600) to the optical modulator (108, 210, 238, 318, 406, 510, 604);

at least one dispersive component (106, 2062, 312, 401, 504, 601) is arranged to form a spectrum of the entrance slit (104, 204, 232, 308, 500, 600) image, the modulator (108, 210, 238, 318, 406, 510, 604) being arranged to modulate the spectrum and to compose measurement radiation of the modulated spectrum;

the spectrometer is arranged to measure measurement radiation from the exit slit (104, 214, 242, 322, 514), characterized in that the spectrometer comprises:

only one detector (110, 216, 244, 326, 424);

the dispersive component (106, 2062, 312, 401, 504, 601) is arranged to disperse the entrance slit (104, 204, 232,

308, 500, 600) image into a spectrum so that each wavelength of the spectrum forms an image of its own from the entrance slit (104, 204, 232, 308, 500, 600), the place of the image on the elements of the optical modulator (108, 210, 238, 318, 406, 510, 604) depending on the wavelength;

a first mirror (208, 236, 316, 508, 601) positioned so as to reflect the optical radiation from the dispersive component (106, 2062, 312, 401, 504, 601) to the optical modulator (108, 210, 238, 318, 406, 510, 604);

the optical modulator (108, 210, 238, 318, 406, 510, 604) comprising at least one modulating element is arranged to modulate the dispersed entrance slit (104, 204, 232, 308, 500, 600) image with at least one element to form at least one wavelength band modulated from the entrance slit (104, 204, 232, 308, 500, 600) image;

a second mirror (212, 240, 320, 512, 605) positioned so as to reflect the optical radiation from the optical modulator (108, 210, 238, 318, 406, 510, 604) to the exit slit (104, 214, 242, 322, 514);

the dispersive component (106, 2062, 312, 401, 504, 605) is arranged to compose non-dispersive measurement radiation from at least one modulated wavelength band so that the entrance slit (104, 204, 232, 308, 500, 600) image at each wavelength band is formed in the same place regardless of the wavelength;

the imaging component (106, 206, 234, 314, 402, 506, 516, 606) is arranged to image by means of measurement radiation the entrance slit (104, 204, 232, 308, 500, 600) to the exit slit (104, 214, 242, 322, 514) which is different from the entrance slit (~104, 204, 232, 308, 500, 600);

the only detector (110, 216, 244, 326, 424) of the spectrometer is arranged to detect measurement radiation from the exit slit (104, 214, 242, 322, 514) and to convert the measurement radiation into an electrical measurement signal; and for spectrum measurement the spectrometer is arranged to demodulate the electrical measurement signal to separate signal components formed by different wavelength bands from one another and to measure at least one wavelength band with at least one signal component.

17. A spectrometer according to claim 16, characterized in that the optical modulator (108, 210, 238, 318, 406, 510, 604) is an optical DMD modulator.

18. A spectrometer according to claim 16, characterized in that the spectrometer is arranged to illuminate the entrance slit (104, 204, 232, 308, 500, 600) with the optical radiation emitted by a sample (102, 202, 230, 304).

19. A spectrometer according to claim 18, characterized in that the spectrometer is arranged to illuminate the sample (102, 202, 230, 304) with measurement radiation and to image the measurement radiation emitted by the sample (102, 202, 230, 304) to the exit slit (104, 214, 242, 322, 514).

20. A spectrometer according to claim 16, characterized in that the spectrometer is arranged to modulate optical properties of the elements of the optical modulator (108, 210, 238, 318, 406, 510, 604) as a function of time so that different wavelength bands are modulated with different waveforms and the spectrometer is arranged to separate different wavelength bands from one another with demodulation corresponding to the modulation.

21. A spectrometer according to claim 16, characterized in that the spectrometer is arranged to modulate optical properties of the elements of the optical modulator (108, 210, 238, 318, 406, 510, 604) as a function of time so that different wavelength bands are multiplexed using time division and the spectrometer is arranged to separate different wavelength bands from one another with demodulation corresponding to the modulation.

22. A spectrometer according to claim 16, characterized in that the spectrometer is arranged to modulate optical properties of the elements of the optical modulator (108, 210, 238, 318, 406, 510, 604) as a function of time so that different wavelength bands are multiplexed using frequency division and the spectrometer is arranged to separate different wavelength bands from one another with demodulation corresponding to the modulation or with filtering.

23. A spectrometer according to claim 16, characterized in that the spectrometer is arranged to modulate optical properties of the elements of the optical modulator (108, 210, 238, 318, 406, 510, 604) as a function of time so that different wavelength bands are multiplexed using code division and the spectrometer: is arranged to separate different wavelength bands from one another with demodulation corresponding to the modulation.

24. A spectrometer according to claim 16, characterized in that the spectrometer comprises only one dispersive component (106, 2062, 312, 401, 504, 601).

25. A spectrometer according to claim 16, characterized in that the spectrometer is produced for one integrated circuit.

26. A spectrometer according to claim 18, characterized in that the spectrometer is arranged to determine the concentration of at least one substance in the sample (102, 202, 230, 304) by means of at least one measured wavelength band.

27. A spectrometer according to claim 18, characterized in that the spectrometer is arranged to determine the thickness of a substance layer in the sample (102, 202, 230, 304) by means of at least one measured wavelength band.

28. A spectrometer according to claim 18 temperature by means of at least one measured wavelength band.

29. A spectrometer according to claim 16, characterized in that the detector (110, 216, 244, 326, 424) is the exit slit (104, 214, 242, 322, 514).

30. A spectrometer according to claim 16, characterized in that the spectrometer is produced for an integrated circuit.

31. A spectrometer according to claim 16, characterized in that the spectrometer is produced using a plane waveguide, LIGA technique and moulded-plastic optics.

* * * * *